Jan. 1, 1929.
J. J. SHOEMAKER
1,697,544
PLOWSHIELD
Filed Sept. 9, 1927
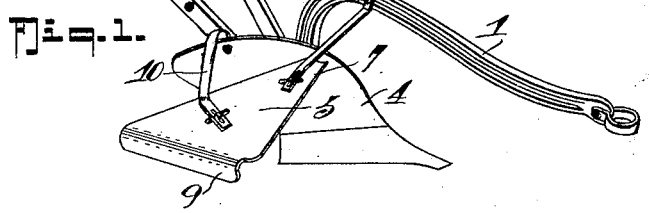
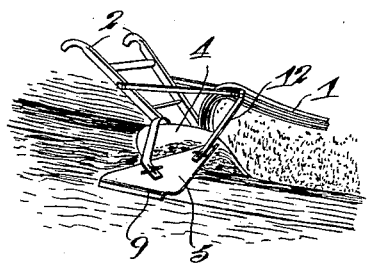
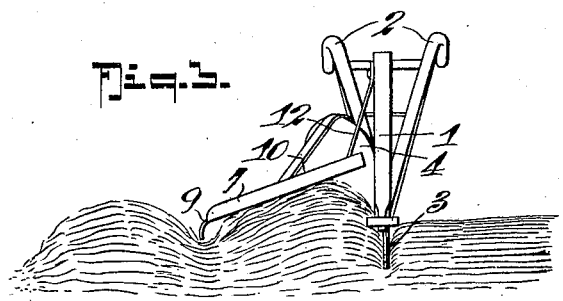
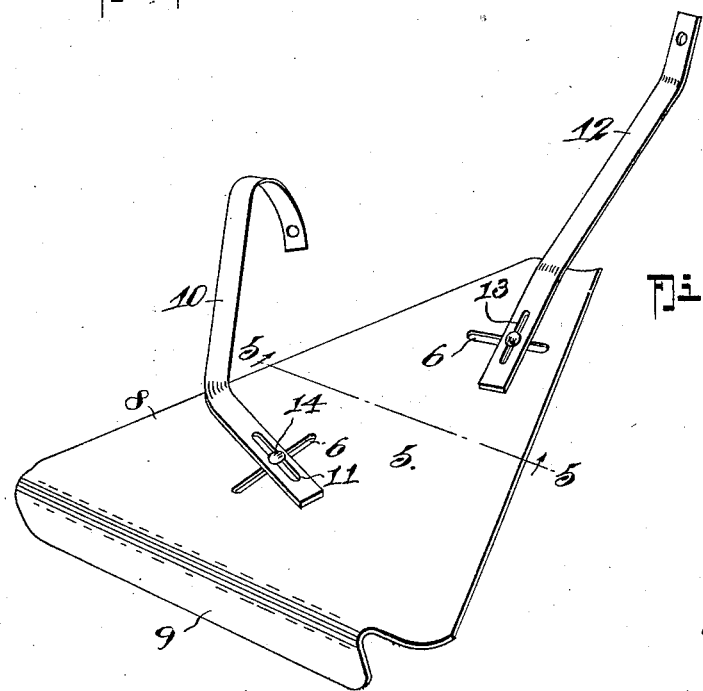
INVENTOR
J. J. Shoemaker.
BY
ATTORNEY Patented Jan. 1, 1929.

1,697,544

UNITED STATES PATENT OFFICE.

JEREMIAH J. SHOEMAKER, OF GARRETTSVILLE, OHIO.

PLOWSHIELD.

Application filed September 9, 1927. Serial No. 218,506.

My invention relates to the art of agriculture and particularly to plows. It has for its primary object to provide a plow with a shield attachment for the purpose of covering and holding down any refuse, weeds, stubble, corn stalks, etc. until properly covered by the plow.

Again it is an object to provide a plow with means to so treat the ground that after the plow has passed, no refuse, weeds, stubble, etc. will stick out between plowed land cuts, so that when a drag is later used it will not catch any refuse and pull out the same, thus with the use of my invention a clean job of plowing can be done.

Other objects will in part be obvious and in part be pointed out hereinafter.

To the attainment of the aforesaid objects and ends, my invention consists in the novel details of construction, and in the combination and arrangement of parts hereinafter more fully described and then pointed out in the appended claims.

In the accompanying drawing showing an illustrative embodiment of the invention, Figure 1 is a perspective view of a plow with my invention applied.

Figure 2 is a perspective view illustrating the invention in use.

Figure 3 is a front elevation of the plow with my attachment applied.

Figure 4 is a perspective view of my attachment on an enlarged scale.

Figure 5 is a detail cross section on the line 5—5 on Figure 4.

Referring now to the drawing in which like numerals of reference indicate like parts in all the figures, 1 represents the plow beam, 2 the handles, 4 the mold board and 3 the plow share, all of which may be of the ordinary construction.

My invention comprises a shield 5 having slots 6 for the reception adjustably of the bolts which secure the shield to the supports 10 and 12 that are fastened to the handles and beam of the plow, respectively.

The shield 5 in top plan view is of general trapezoidal form having its sides parallel, its front normal to the sides and its rear inclined thereto.

The front edge of the shield 5 is turned or curved upwardly as at 7 while the rear edge is curved downwardly as at 8.

The side farthest from the plow is curved downwardly as at 9 and adapted to ride in the furrow left by the plow on a preceding cut.

10 and 12 are the supporting brackets which are fixedly secured at one end to the handles 2 and beam 1 of the plow and have their other ends slotted as at 11 and 13 to receive the securing bolts 14, thus enabling the shield to be adjusted to proper position to enable it to effect its intended purpose.

It will be seen by reference to Figure 2 that when my attachment is used the end 9 rides along the land side of the furrow previously cut by the plow and the shield 5 overlies the strip of ground to be turned over by the plow.

The upturned edge 7 of the shield 5 will thus engage the stubble and weeds and bend the same over forwardly as the shield passes over the same thus assuring that the plow in turning the furrow will cover completely the refuse, stubble and weeds and not leave any ends sticking up to be caught later by the drag.

The rear edge 8 being downturned acts not only as a scraper or cutter but, by reason of its convex surface, aids the mold board in effecting a clean turn-over of the plowed ground.

From the foregoing description, taken in connection with the accompanying drawing, it is thought the construction, uses and advantages of my invention will be clear to those skilled in the art to which it relates.

What I claim is:

1. In combination with a mold board plow, a laterally extending trapezoidal plate having a narrow inner and a wider outer edge and front and rear edges, and means to mount the plate in cooperative relation with the mold board and on an incline downwardly toward its outer edge, the front edge of said plate being arranged substantially normal to the said outer edge, and the said rear edge being downturned and arranged substantially transverse to the direction in which the ground is thrown by the mold board whereby said downturned edge will tend to cut weeds turned over with the ground.

2. In combination with a mold board plow, a laterally extending trapezoidal plate having a narrow inner and a wider outer edge and front and rear edges, and means to mount the plate in cooperative relation with the mold board and on an incline downwardly toward its outer edge, the said outer edge being downturned and adapted to enter a previously plowed furrow, the front edge of said plate being arranged substantially normal to the said outer edge, and the said rear edge being downturned and arranged substantially transverse to the direction in which the ground is thrown by the mold board whereby said downturned edge will tend to cut weeds turned over with the ground.

3. A plow shield comprising a flat plate having two opposite front and rear long edges and two opposite short edges one of which is shorter than the other, means for supporting said plate at one side of a plow to lie inclined downwardly from the plow with its short edge of least length located adjacent the plow, the other short edge of the plate being turned down to enter a previously plowed furrow, the front edge of said plate being upturned and lying approximately normal to the said other short edge, and the rear edge of said plate being downturned for the purposes described.

4. A plow shield comprising a flat plate having two opposite front and rear long edges and two opposite short edges one of which is shorter than the other, means for supporting said plate at one side of a plow to lie inclined downwardly from the plow with its short edge of least length located adjacent the plow, the other short edge of the plate being turned down to enter a previously plowed furrow, the front edge of said plate being upturned and lying approximately normal to the said other short edge, the rear edge of said plate being downturned, said supporting means comprising a bar extending from the plow beam to the plate adjacent its shortest edge, and a second bar extending from the plow adjacent the handle to the plate adjacent its other short side, said plate and said bars having crossed slots, and bolts passed through said slots for adjustably holding the plate to the bars.

JEREMIAH J. SHOEMAKER.